INVENTORS
JAMES L. LAWSON
FRANCIS W. MARTIN
BY
William D. Hull.
ATTORNEY

Patented Feb. 7, 1950

2,496,551

UNITED STATES PATENT OFFICE 2,496,551

LOGARITHMIC CASCADE AMPLIFIER

James L. Lawson and Francis W. Martin, Cambridge, Mass., assignors, by direct and mesne assignments, to the United States of America as represented by the Secretary of War Application December 10, 1945, Serial No. 634,074

7 Claims. (Cl. 250—27)

This invention relates to measuring devices and more particularly to logarithmic voltmeters.

In many applications in the electronic art and in other related fields it is desirable to have a voltmeter circuit whose output is proportional to the logarithm (to some convenient base) of the amplitude of an input signal to be measured. Such amplifiers are useful where signal voltages varying over a wide range are to be measured on a single scale, and they are especially useful where it is desirable to have a meter with a linear decibel scale.

Logarithmic voltmeter circuits involving amplifiers are known in the art, with one type of logarithmic amplifier being disclosed in the copending application of Logan M. Belleville, Serial No. 604,035, filed July 9, 1945. Such circuits, however, do not generally possess characteristics that make them adaptable for use over a large range, for example 60 decibels or more.

It is an object of the present invention, therefore, to provide a novel logarithmic voltmeter circuit for measuring voltages over a wide range of values.

It is a further object of this invention to provide a voltmeter circuit for measuring voltages with high accuracy over an extended range of values.

For a better understanding of the invention, together with other and further objects thereof, reference is had to the following description taken in connection with the accompanying drawings in which.

Figure 1:
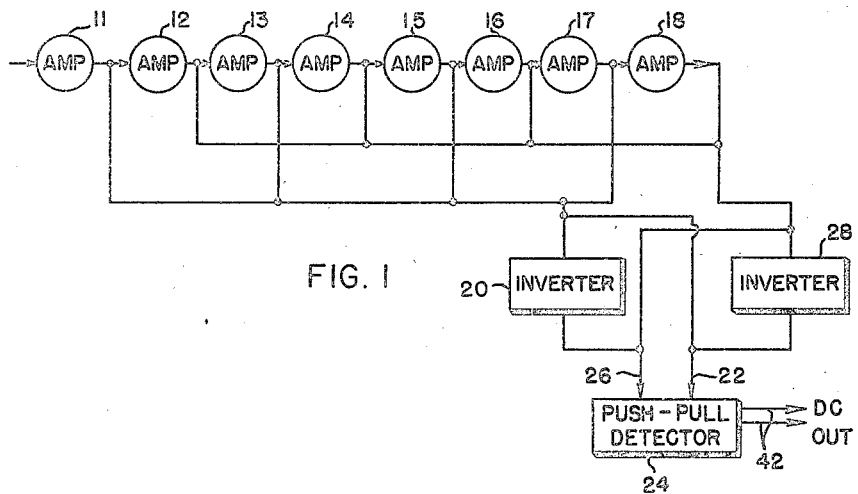
Fig. 1 is a block diagram of the present invention.

Referring now more particularly to Fig. 1 of the drawings, there are shown in block diagram form eight amplifiers, namely, amplifiers 11, 12, 13, 14, 15, 16, 17, and 18, all connected in series. In this circuit the signal or voltage to be measured is connected to the input terminal of amplifier 11. A portion of the output of amplifier 11 is applied to the input of amplifier 12, a portion of the output of amplifier 12 is applied to the input of amplifier 13 and so forth throughout the series. Each of these amplifiers (11 through 18) is designed to provide an output that is a linear function of its input signal until the input signal is of sufficient amplitude to saturate the amplifier. When an input signal reaches an amplitude sufficient to saturate a given amplifier, to which it is applied, the amplitude of the output of that amplifier will remain substantially constant. The output signal of each of these amplifiers will be inverted in phase with respect to the input signal to that amplifier. This phase inversion is the known phase relationship between input and output signals of a single stage amplifier.

The output voltages of amplifiers 11, 13, 15, and 17 are additively combined and applied to an inverter 20 and to an input lead 22 of a push-pull detector 24. The output of inverter 20 is connected to a second input lead 26 of detector 24. The output voltages of amplifiers 12, 14, 16, and 18 are similarly additively combined and applied to an inverter 28 and to input lead 26 of detector 24. The output of inverter 28 is connected to input lead 22 of detector 24.

Figure 4:
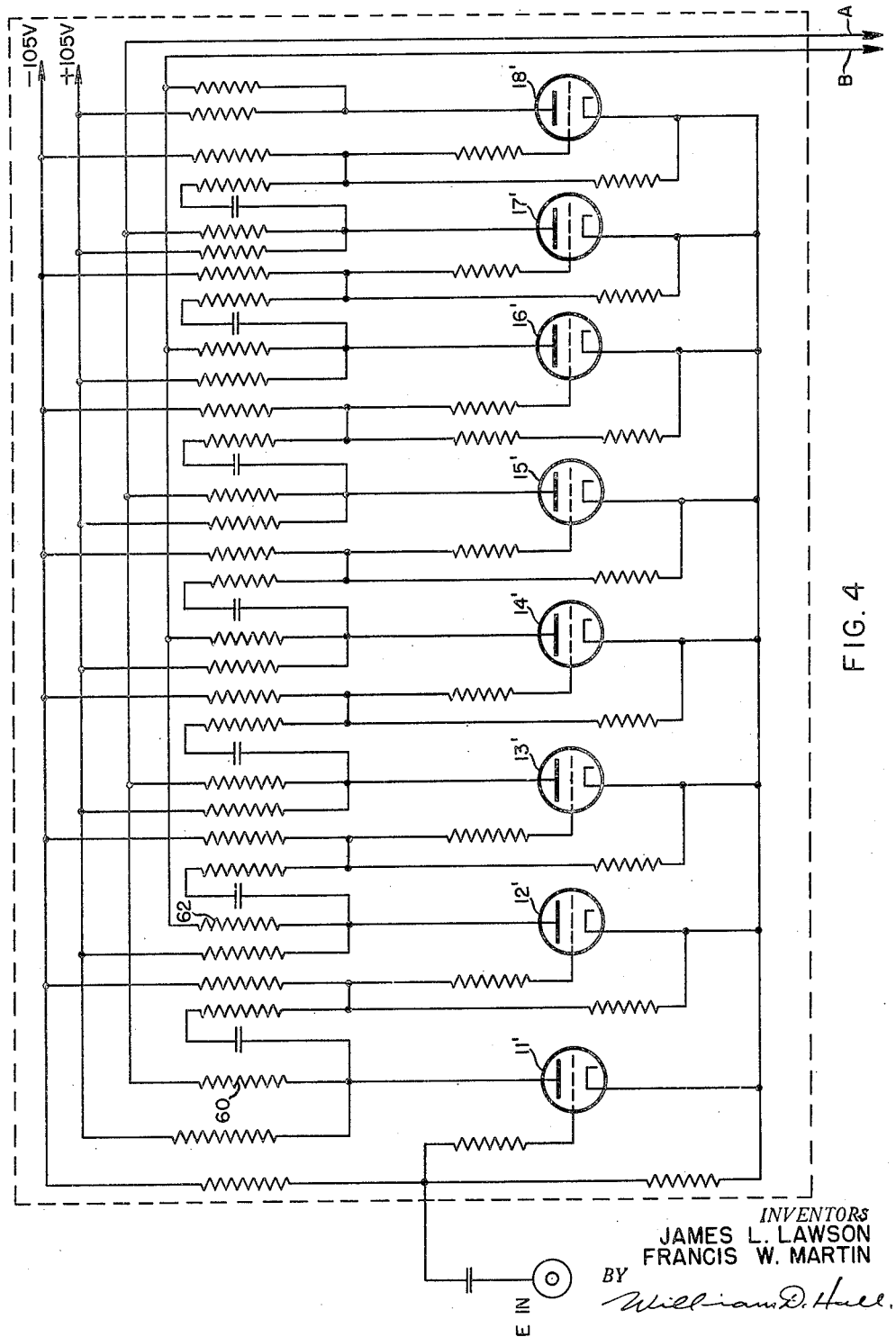
Figs. 4 and 5 together form a schematic wiring diagram of one embodiment of the invention that has been found to operate extremely well.

The schematic diagram of this circuit, shown in Fig. 4, more clearly illustrates the above connections, but a description of this figure is deferred until after the operation of the block diagram of Fig. 1 has been explained.

Figure 2:
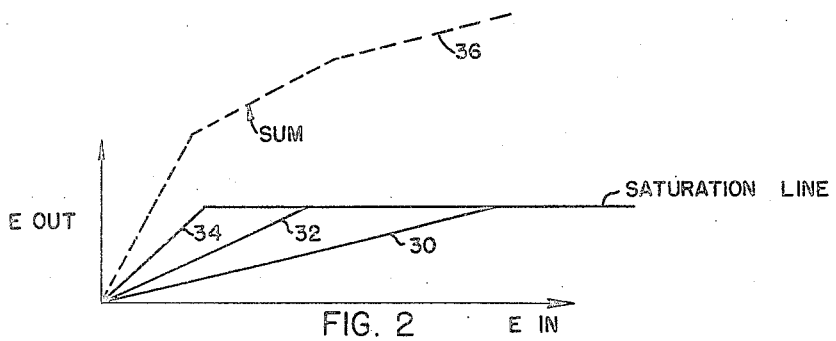
Fig. 2 is a graph showing voltage relationships in the circuit of Fig. 1.

Referring now to Fig. 2 of the drawings, curves 30, 32, and 34 represent the amplitude of output signals from amplifiers 16, 17, and 18, respectively, as functions of the amplitude of the input signal applied to amplifier 11. These curves are plotted with the amplitude of the alternating voltage output as the ordinate against the amplitude of the input signal to amplifier 11 as the abscissa. It can be seen that the curve 34 rises to saturation first, since the input signal has been amplified by all eight amplifiers by the time it reaches the output circuit of amplifier 18. The slope of curve 32 is less steep than that of curve 34, since the signal in the output circuit of amplifier 17 has been amplified by only seven of the amplifiers. Continuing in the same fashion, the slopes of curves corresponding to preceding amplifiers are progressively less steep, and there are here shown, for convenience, only curves 30, 32, and 34 corresponding to the final three amplifiers 16, 17, and 18. The curve representing the sum of these several output signal characteristics, indicated by dashed line 36, although not actually a smooth curve does approximate an exponential or logarithmic curve.

Figure 3:
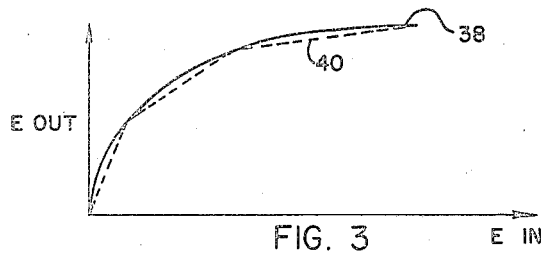
Fig. 3 is a second graph showing the relationship of the curves of Fig. 2 to a logarithmic curve.

Referring now to Fig. 3 of the drawings, there is shown in full line a logarithmic curve 38 plotted against the same reference axes as the curves of Fig. 2. Dashed line curve 40 of Fig. 3 represents the sum of all output signals from all the amplifiers of Fig. 1. It can be seen that curve 40 very closely approximates curve 38. It is possible by proper design of the amplifiers to keep the maximum deviation of curve 40 from curve 38 to less than plus or minus one-half of one decibel over a range of at least sixty decibels.

Referring again to the simplified block diagram shown in Fig. 1 of the drawings, inverters 20 and 28 are to be regarded as inverting but not amplifying signals applied thereto. It is evident that the input to push-pull detector 24 at either 26 or input lead 22 is the sum of the outputs from all eight amplifiers, or proportional thereto if the signals combined at the input leads are first suitably amplified. The signals applied to input leads 22 and 26 of detector 24 are in phase opposition, a necessary condition for proper operation of the push-pull detector 24. Detector 24 is a so-called peak detector in that this circuit supplies a unidirectional potential at output leads 42 (also designated D. C. out), that is substantially equal to the peak value of the alternating potential supplied to its input. The unidirectional output potential of detector 24, therefore, is proportional to the logarithm, to some convenient base, of the amplitude of the input voltage. The output voltage at leads 42 may be applied to a suitable meter (not shown) the scale of which is graduated in input voltage, decibels, or both.

Referring now to Fig. 4 of the drawings, there is shown a schematic wiring diagram of an embodiment of the amplifier portion of the invention. A signal input terminal marked $E_{in}$ is connected to the first of eight resistance coupled amplifiers. These eight amplifiers correspond to amplifiers 11 to 18, Fig. 1, and their tubes are designated by primed numbers coresponding to the numbered amplifiers shown in Fig. 1. The combined output of the odd numbered amplifiers, that is, amplifiers 11, 13, and so forth, appears at the lead designated by the character A, and the combined output of the even numbered amplifiers, that is, amplifiers 12, 14, and so forth, appear at the lead designated by the character B.

Figure 5:
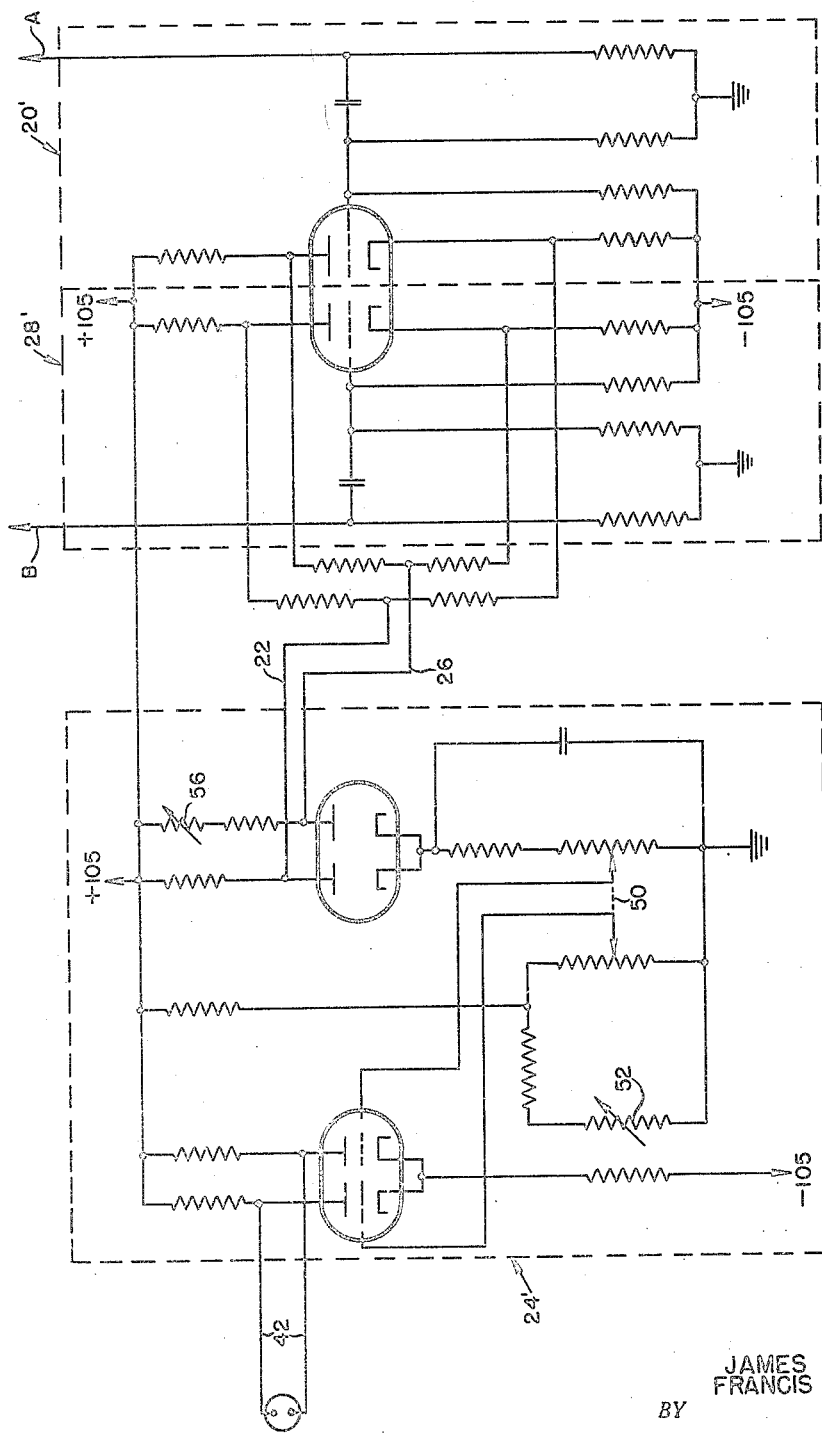

Fig. 5 of the drawings is a continuation of the circuit diagram shown in Fig. 4. Leads A and B in Fig. 5 are extensions of the correspondingly designated leads in Fig. 4. The circuits inclosed in the dashed line blocks designated 20' and 28' in Fig. 5 correspond to inverters 20 and 28, respectively, of Fig. 1. In these circuits of Fig. 5, inverters 20' and 28' are linear voltage amplifiers, each having a cathode impedance as well as an anode impedance. It was stated in connection with the simplified diagram description of Fig. 1 that inverters 20 and 28 do not amplify the signal. Inverters 20' and 28' in the circuit of Fig. 5 amplify the signals, and the signals to be combined with these inverted signals are also amplified by an equal amount. The signals applied to detector 24 are thus proportional to the sum of the outputs from all eight amplifiers. The circuit inclosed within the dashed line block 24', Fig. 5, corresponds to the push-pull detector circuit 24 of Fig. 1. The double diode tube in this circuit serves as a full wave detector while the push-pull double triode tube circuit provides a push-pull unidirectional output voltage. Dual potentiometer 50 of Fig. 5 provides means for adjusting the amplitude of the output voltage of detector 24', and the adjustable resistor 52 provides means for making preliminary adjustment of the output potential of detector 24' when the amplitude of the input signal is at zero level. The adjustable resistor 56 provides means for balancing the output of the two halves of the double diode detector circuit.

If resistors 60, 62 and the corresponding resistors in the other amplifier stages are made equal the linear range of this voltmeter circuit extends to the point where amplifier 12', Fig. 4, begins to saturate. The linear range of the circuit may be extended to a point where amplifier 11' starts to saturate by making the resistance of resistor 60 one-half of the value of the corresponding resistors in the other amplifiers.

It is to be understood that the amplifiers employed in this circuit do not actually saturate suddenly as might appear from the simplified diagram given in Fig. 2. Actually, when the saturation region is reached the curve bends sharply but in a curve of finite radius. As a result of this curvature, the sum of the outputs from all of the amplifiers more nearly approximates a logarithmic curve than does the sum of the straight line characteristics shown in Fig. 2.

Among characteristics of the disclosed voltmeter circuit are that: (1) using eight single tube amplifiers, the voltmeter provides a range of at least 60 decibels with an accuracy of plus or minus 0.5 decibel; (2) the range of this meter may be increased by adding more amplifiers or reduced by using fewer amplifiers; (3) the accuracy may be increased by using more amplifiers with less gain in each, or the range may be extended by increasing the gain of each amplifier; and (4) the push-pull detector provides an output with minimum ripple and no odd harmonics.

While there has been described what is at present considered the preferred embodiment of the invention, various changes and modifications obvious to those skilled in the art may be made therein without departing from the invention.

What is claimed is:

1. A voltmeter circuit, comprising a plurality of voltage amplifiers, each adapted to linearly amplify an input signal to be measured, said amplifiers each being further adapted to provide an output signal that approaches a constant value when its input signal exceeds a predetermined amplitude, means for applying a signal to be measured to the first of said amplifiers, means for additively combining all the output signals having a first phase, means for additively combining all the output signals having an opposite phase, first inverter means for inverting the combined signal having said first phase, second inverter means for inverting the combined signal having said opposite phase, a push-pull detector circuit, means for applying said combined signals of said first phase and the inverted combined signals of said opposite phase to said detector circuit, and means for applying said combined signals of said opposite phase and the inverted combined signals of said first phase to said detector circuit, whereby said detector circuit produces a unidirectional output potential proportional to the logarithm of the amplitude of said input signal to be measured.

2. A logarithmic amplifier circuit comprising a plurality of saturable amplifiers each having a cathode, an anode and at least one control electrode connected in a series combination, means for applying a signal to be amplified as the input signal to the control electrode of the first amplifier in said series combination, means for obtaining two sets of output signals from the anode circuits of said amplifiers in said series combination, and means for combining said output signals from each of said amplifiers in a push-pull circuit to produce a signal that is equal in amplitude to the summation of the absolute amplitudes of all of said output signals whereby the amplitude of said combined signal is proportional in amplitude to the logarithm of the amplitude of said signal to be amplified.

3. A logarithmic amplifier circuit comprising a plurality of saturable amplifiers connected in series, means for applying an input signal to the first amplifier in said series, means for obtaining an output signal from each amplifier in said series, first signal combining means for combining the output signals of the odd numbered amplifiers in said series, second signal combining means for combining the output signals of the even numbered amplifiers in said series, inverter means for inverting the phase of the signal from one of said two signal combining means, third signal combining means for combining the output of said inverter means and the other of said two signal combining means whereby the output of said third signal combining means is a signal that is proportional in amplitude to the logarithm of the amplitude of said input signal.

4. A logarithmic amplifier circuit comprising a plurality of identical saturable voltage amplifiers connected in a series combination, means for applying a signal to be measured to the first amplifier in said series combination, means for obtaining an output signal from each of said amplifier circuits, means for additively combining the output signals from the first, third and all subsequent odd amplifiers in said series combination to form a first combined signal, means for additively combining the output signals from the second, fourth and all subsequent even amplifiers in said series combination to form a second combined signal, means for inverting the phase of one of said combined signals, means for additively combining the other of said combined signals with said inverted signal to form a third combined signal whereby said third combined signal is proportional in amplitude to the logarithm of the amplitude of said input signal.

5. A logarithmic amplifier circuit comprising a plurality of voltage amplifiers each adapted to receive a single input signal and to provide a first and a second output signal, each of said output signals from each amplifier having an amplitude that is a linear function of the amplitude of the input signal to that amplifier for all values of input signal below a predetermined amplitude and having a substantially constant amplitude for all values of input signal above said predetermined amplitude, means connecting said amplifiers in a series combination whereby said first output signal from each amplifier is applied as the input signal to the next succeeding amplifier in said series, means for applying the signal to be amplified as the input signal to the first amplifier in said series, first signal combining means combining said second output signals from the first, third and all subsequent odd amplifiers in said series, second signal combining means combining said second output signals from the second, fourth and all subsequent even amplifiers in said series, signal inverting means for inverting the phase of the signal from one of said two signal combining means and third signal combining means for combining the signal from said signal inverting means with the signal from the other of said two signal combining means whereby the amplitude of the output signal of said third combining means is proportional in amplitude to the logarithm of the amplitude of said signal to be amplified.

6. Apparatus in accordance with claim 5 wherein said third signal combining means provide an output signal that is proportional in amplitude to the algebraic sum of the amplitudes of the input signals applied thereto.

7. Apparatus in accordance with claim 5 wherein said signal inverting means inverts the phase of the signal from said first signal combining means and wherein said third signal combining means combines the signals from said signal inverting means and said second signal combining means, said apparatus further comprising a second signal inverting means for inverting the phase of the signal from said second signal combining means, and fourth signal combining means combining the signals from said second signal inverting means and said first signal combining means whereby said fourth signal combining means provides a signal that is equal in amplitude but opposite in phase to the signal from said third signal combining means.

JAMES L. LAWSON.
FRANCIS W. MARTIN.

REFERENCES CITED

The following references are of record in the file of this patent:

UNITED STATES PATENTS

| Number | Name | Date |
|---|---|---|
| 2,289,840 | Herz | July 14, 1942 |
| 2,313,666 | Peterson | Mar. 9, 1943 |
| 2,369,811 | Stuart | Feb. 20, 1945 |